(12) United States Patent
Stahulak et al.

(10) Patent No.: US 8,538,385 B2
(45) Date of Patent: Sep. 17, 2013

(54) MOBILE DEVICE PANIC FUNCTION WITH RECORDABILITY

(75) Inventors: Charles Stahulak, Chicago, IL (US);
Bruce Barnes, Pingree Grove, IL (US);
Patrick Kenny, Barrington, IL (US);
Shadi Khoshaba, Skokie, IL (US);
Dolores J. Mallian, St. Charles, IL (US);
Nikhil Marathe, Roselle, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/597,231

(22) Filed: Aug. 28, 2012

(65) Prior Publication Data

US 2012/0322404 A1     Dec. 20, 2012

Related U.S. Application Data

(63) Continuation of application No. 12/573,769, filed on Oct. 5, 2009, now Pat. No. 8,254,889.

(51) Int. Cl.
*H04W 4/12*     (2009.01)

(52) U.S. Cl.
USPC ................................ 455/412.1; 455/418

(58) Field of Classification Search
USPC .................... 455/412.1, 418, 556.1, 557, 564
See application file for complete search history.

(56) References Cited

U.S. PATENT DOCUMENTS

2010/0210237 A1*   8/2010   Tomer ...................... 455/404.2

* cited by examiner

*Primary Examiner* — Sam Bhattacharya
(74) *Attorney, Agent, or Firm* — Hartman & Citrin LLC

(57) ABSTRACT

Devices, systems and methods are disclosed which relate to recording a conversation on a portable communications device. This allows the user to press a panic button or a series of buttons on their portable communications device to begin recording the conversation. This conversation may be stored on a memory of the portable communications device or in a network in communication with the portable communications device. With the conversation recorded, there is a record of what was said during the call. This record may later be used if necessary.

20 Claims, 4 Drawing Sheets

MOBILE DEVICE PANIC FUNCTION WITH RECORDABILITY

This application is a continuation of U.S. patent application Ser. No. 12/573,769, filed Oct. 5, 2009, now U.S. Pat. No. 8,254,889, the content of which is incorporated by reference herein in its entirety into this disclosure.

BACKGROUND OF THE INVENTION

1. Field of the Invention

The present invention relates to network communications. More specifically, the present invention relates to recording a conversation over a communications network.

2. Background of the Invention

Cellular (or mobile) telephones allow users to stay in contact with friends, family, co-workers, and various other individuals all with a portable device. This ability has led to over 4 billion cellular telephone subscriptions worldwide. However, with this great ability to contact almost anyone almost anywhere there is a darker side.

Cellular telephones also allow users to be contacted by unwanted, sometimes violent callers. When unwanted callers determine a user's cellular telephone number, these unwanted callers also have the ability to contact the user anytime. While this may only be a salesman, the unwanted caller may also be a scammer or an individual wishing to harass the user.

Harassing telephone calls can annoy, scare, or even endanger a cellular telephone user. These harassing telephone calls can and do sometimes lead to physical violence. Violent crimes may occur after people have had several conversations on cellular telephones. Often a user of a portable communications device is on a telephone call when the other party begins making threats or statements in which the user wants to make a record.

For instance, in the Chicago area, recently there have been several missing person's cases where law enforcement officials have records of a conversation between the missing individual and persons of interest. Unfortunately police have no record of what was said during the conversations.

What is needed is a way to provide a record of what was said during unwanted or harassing telephone calls such that the record can later be used for document or evidence purposes if necessary.

SUMMARY OF THE INVENTION

The present invention provides systems and methods for recording a conversation on a portable communications device. The present invention allows the user to press a panic button or a series of buttons on their portable communications device to begin recording the conversation. This conversation may be stored on a memory of the portable communications device or in a network in communication with the portable communications device. With the conversation recorded, there is a record of what was said during the call. This record may later be used if necessary. Furthermore, an option to record a buffer of a conversation is disclosed. If an unsuspicious caller suddenly makes a threatening or otherwise offensive comment, a user may not have started the recording process. However, a buffer can keep a short-term recording of the past few seconds or minutes of conversation that is converted to a long-term recording once the panic button is pressed or the code is entered. With this option, the user can not only start the recording, but also save what was just said during the conversation.

In one exemplary embodiment, the present invention is a communications device for recording a conversation. The communications device includes a processor, a memory in communication with the processor, a recording logic stored on the memory, a transceiver in communication with the processor, and an input in communication with the processor to activate the recording logic. The recording logic is activated to record a conversation on the memory.

In another exemplary embodiment, the present invention is a communication system for recording a conversation. The communication system includes a first communication device having an input, a second communication device in communication with the first communication device in a conversation, a recording server in communication with the first and second communication devices, a recording logic stored on the server, and a recorded conversation database in communication with the server. The recording logic is activated to record the conversation to the recorded conversation database.

In yet another exemplary embodiment, the present invention is a method for recording a conversation between communication devices in a communications network. The method includes receiving a user activation of a recording logic, and recording a conversation to one of a memory and a database.

DETAILED DESCRIPTION OF THE INVENTION

Figure 1:
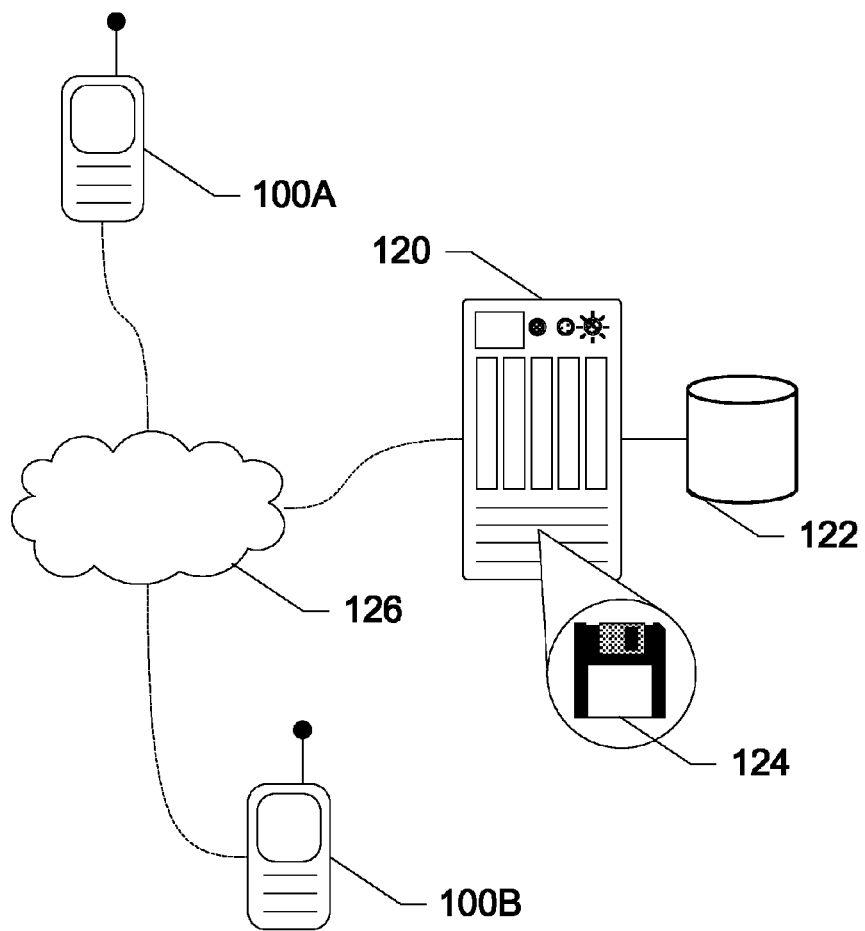
FIG. 1 shows a system for recording a conversation, according to an exemplary embodiment of the present invention.

The present invention provides systems and methods for recording a conversation on a portable communications device. The present invention allows the user to press a panic button or a series of buttons on their portable communications device to begin recording the conversation. This conversation may be stored on a memory of the portable communications device or in a network in communication with the portable communications device. With the conversation recorded, there is a record of what was said during the call. This record may later be used if necessary. Furthermore, an option to record a buffer of a conversation is disclosed. If an unsuspicious caller suddenly makes a threatening or otherwise offensive comment, a user may not have started the recording process. However, a buffer can keep a short-term recording of the past few seconds or minutes of conversation that is converted to a long-term recording once the panic button is pressed or the code is entered. With this option, the user can not only start the recording, but also save what was just said during the conversation.

This invention can be part of the memory that is included with the communications device at the time of purchase. It can be part of an option to buy additional memory on the communications device. Alternatively, it can be a service that is provided by a communications service provider for a monthly charge. This service can also be offered as a real time service. Meaning a user does not have to purchase the service until they felt threatened. Activation is as easy as entering a code on the communications device.

If an individual fears for his/her life, it might be beneficial to inform the aggressor that they have several recorded conversations of them threatening the individual fearing for their life, possibly preventing a crime. The recorded conversation may very accurately depict the tone or nature of the threatening individual. It may also provide valuable information to the police if the individual went missing. If an individual is missing, law enforcement can simply contact the communications service provider and retrieve the missing individuals recorded conversations.

"Communications device," as used herein and throughout this disclosure, refers to any device capable of sending and receiving audible data. Examples of a communications device include telephones, cellular telephones, personal digital assistants (PDAs), computers, etc.

"Conversation," as used herein and throughout this disclosure, refers to any dialogue between two or more people. This can be achieved using electronic communication such as landline telephones, cellular telephones, or any other electronic device capable of sending and receiving at least an audio portion of a communication. Services such as three-way calling, conference calling, etc., allow for more than two people to communicate, yet such communication is fully within the scope of a conversation.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

In exemplary embodiments of the present invention, a server on a network may record calls between devices connected to the network when one of the devices signals the server. For example, a user may receive a call from a second party and begin having a conversation. The conversation continues for a while before the second party becomes angry. The second party begins threatening the user and the user becomes afraid that the second party may actually act on these threats. The user presses a panic button, or a series of keys, on their device to begin a recording process. The rest of the conversation is then recorded by the server. This recorded conversation may later provide evidence of the conversation. This may be useful if the second party continues the threats, begins otherwise harassing the user, etc. If something happens to the user, these conversations may be used to help determine what may have happened.

FIG. 1 shows a system for recording a conversation, according to an exemplary embodiment of the present invention. In this embodiment, the system includes a user communications device 100A, a communications network 126, a remote communications device 100B, an application server 120, a recorded conversation database 122 in communication with application server 120, and a recording logic 124 on application server 120. User communication device 100A is connected to remote communications device 100B through communications network 126 allowing the user to have a conversation with another user. The user may push a sequence of buttons on the keypad of user communications device 100A to begin recording the call. When the sequence of buttons is pressed, a signal is sent to application server. Application server 120 is in communication with user communications device 100A and remote communications device 100B through communications network 126 and includes recording logic 124. When application server 120 receives the command sent from user communications device 100A, application server 120 activates recording logic 124. Recording logic 124, when activated, causes application server 120 to begin recording the conversation between user portable communications device 100A and remote communications device 1008. The recording of the conversation is stored on database 122 where it can later be retrieved.

In other embodiments of the present invention, the communications network ranges from global networks, such as a cellular network, to small area networks, such as an intra-office wired network. User communications device has a numeric keypad to dial telephone numbers with, yet in other embodiments the user communications device has a dedicated "panic" button which performs the same function as dialing the code. The application server may be in many possible locations on a communications network and still perform the same function.

In exemplary embodiments of the present invention, the conversation recording feature is used in concert with a call trace feature, such as the *57 feature AT&T currently offers. This call trace feature allows a user to initiate a trace of an unwanted call that may be obscene, threatening or harassing in nature. Calls are charged on a per-use basis only. To activate this call trace feature after receiving such a call, the user hangs up the telephone and ensures the call is disconnected. The user then dials *57. An announcement plays, prompting for confirmation to trace the call. A toll-free number is provided as part of the network announcement upon a successful trace. Should the user wish to file a complaint or take legal action, the user calls the toll-free number provided. An unsuccessful trace is followed by an error message. In conjunction with the present invention, this feature allows the user to file a complaint and have an actual record of the call.

The system allows law enforcement officials to listen to the last conversation(s) between individuals of interest and missing persons if the missing individual purchased a communications device with this feature or service. Even if the conversation is not admissible in court, the voice of the missing person may still be admissible.

Figure 2:
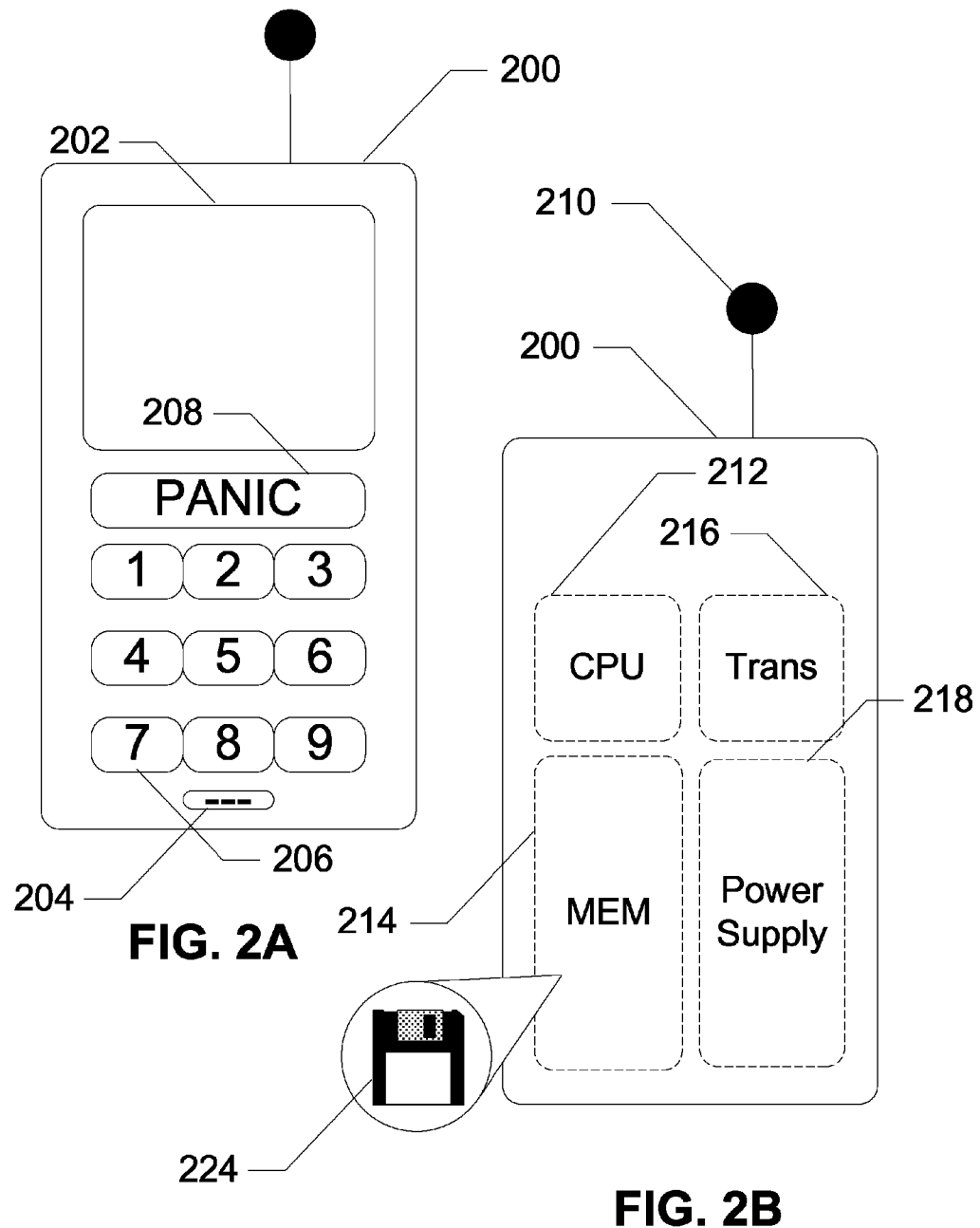
FIG. 2 shows a communications device with a dedicated panic button, according to an exemplary embodiment of the present invention.

FIGS. 2A and 2B show a communications device 200 with a dedicated panic button 208, according to an exemplary embodiment of the present invention. In this embodiment, communications device 200 includes a display 202, an antenna 210, a keypad 206, a microphone 204, a dedicated panic button 208, a central processing unit (CPU) 212, a transceiver 216, a memory 214, a recording logic 224 on memory 214, and a power supply 218. Display 202 may be an LCD, LED, etc. and allows a user to view information and media from the communications device, key presses, network information, etc. Antenna 210 allows communications device 200 to communicate wirelessly with available networks or devices. Keypad 206 provides keys to input numbers and letters, make selections, etc. Keypad 206 may be actual buttons, a touch-sensitive screen for inputs, etc. Microphone 204 provides a speech or sound input for communications device 200. Dedicated panic button 208 begins the recording of a current conversation. Dedicated panic button 208, like keypad 206, may be a physical button, a location on a touch-sensitive screen, etc. Power supply 218 provides a source of power for each of the elements of communications device 200. Memory 214 stores logic, files, etc. on communications device 200. CPU 212 executes selected logic from memory. Recording logic 224 is an application or series of commands that controls the recording of a conversation. When activated, recording logic 224 instructs CPU 212 to record a current conversation to memory 214 of communications device 200. This recording may involve receiving inputs from microphone 204 as well as inputs from a network, etc. Alternatively, when activated, recording logic 224 sends a message through transceiver 216 to the network where the conversation is recorded to a database.

Other exemplary embodiments of the communications device may not include a dedicated panic button. These embodiments still possess the recording logic which allows the user to record a conversation. The recording logic is activated by inputting a key combination, a code, etc. Some embodiments of the communications device employ touch screens for use as the input. A soft key is displayed on the touch screen of these communications devices which activates the recording logic upon being pressed. Other embodiments of the communications device include accelerometers to detect relative motion of the communications device itself. In these embodiments the recording logic can be activated by making a particular motion with the communications device such as flipping it over, turning it around, shaking it, etc.

Figure 3:
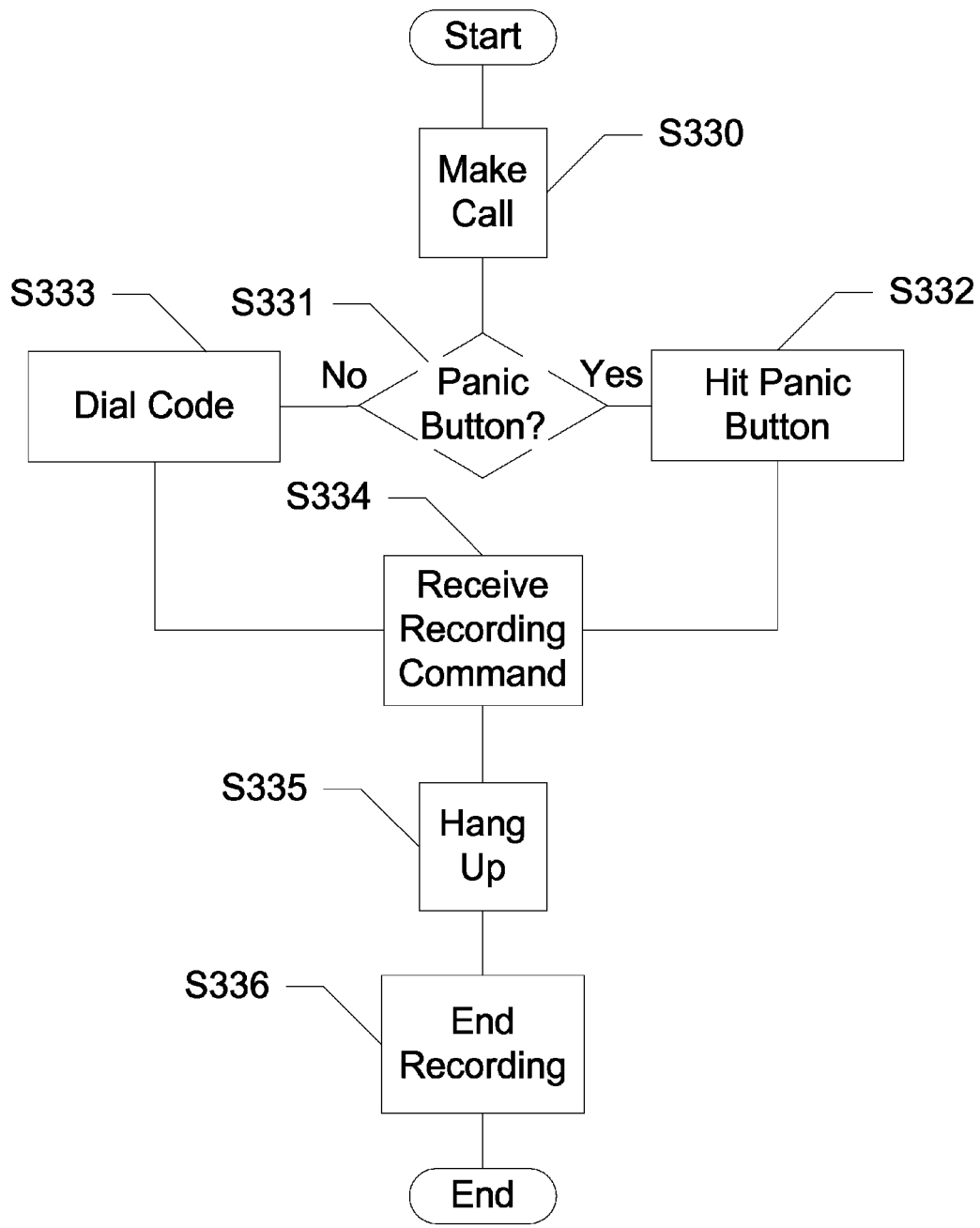
FIG. 3 shows a flowchart of a method of recording a conversation, according to an exemplary embodiment of the present invention.

FIG. 3 shows a flowchart of a method of recording a conversation, according to an exemplary embodiment of the present invention. In this embodiment the method begins when a user of a communications device makes or receives a call S330. At this point the user begins a conversation with the other party. At any point during the conversation, the user may wish to record the call. For instance, the other party may make a threat to the user and the user may wish to record further evidence of the threat or any future threats during the call. To begin recording the conversation, it must be determined whether the communications device has a panic button S331. If the communications device has a panic button, the user presses the panic button on the communications device S332. If the communications device does not have a panic button, the user dials a code on the keypad on the communications device S333. If either the code is dialed S333 or the panic button is hit S332, the communications device sends a record command which is received by a recording logic S334. This recording logic may be on a memory of the communications device itself, on a memory or database of a server on a network, etc. The recording continues until the user hangs up, disconnecting the call S335. At this point the recording is ended S336. The recording remains saved in the memory or database for later use.

A service provider or owner of the communications network may find it profitable to charge a fee for this service, especially in embodiments where the recording logic is on an application server on the communications network. The service provider may charge per use, or on a monthly basis. The fee may be imposed when the recording begins as a flat rate, or when the recording ends based on the length of the recording.

In some instances, a user receives a threat or otherwise offensive comment without warning. In this case, the user is unable to capture the comment by starting the recording. However, the recording logic may have a recording buffer option. This option allows the user to keep a recorded buffer of the last few seconds, minutes, etc., of the conversation recorded in a short-term fashion to a memory or database. Once a user receives the offensive comment the user activates the recording logic as described herein above. However, with the buffering option, the recording logic not only begins recording the conversation but adds the recorded buffer to the beginning of the conversation. Using the communications device in this manner allows a person to save the offensive comment even though the recording logic was activated after the comment was made. Once the comment is made, the user has an amount of time to activate the recording logic equal to the size of the recording buffer in units of time. The size of the recording buffer will vary with memory size, audio quality, etc.

Figure 4:
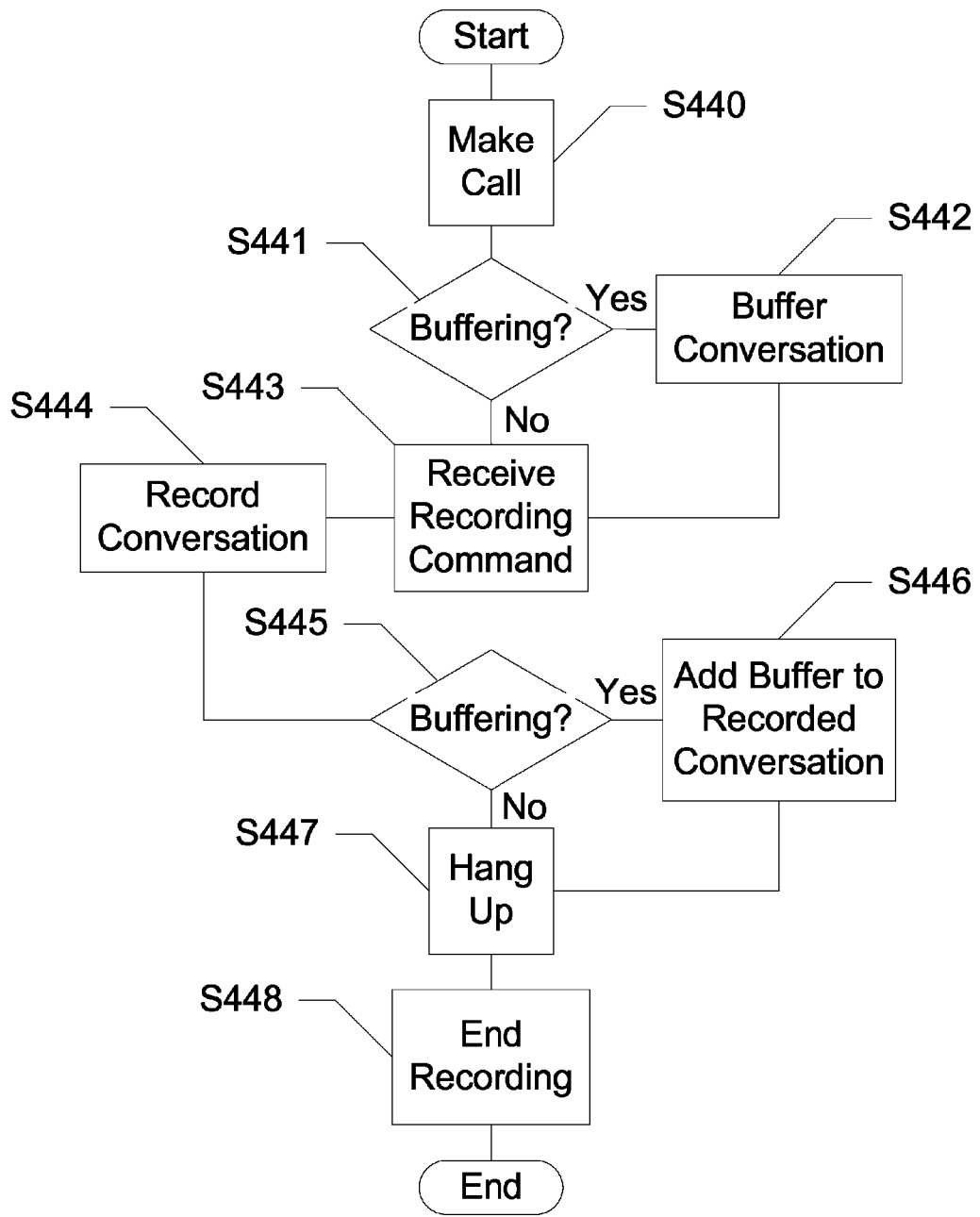
FIG. 4 shows a flowchart of a method of recording a conversation, according to an exemplary embodiment of the present invention.

FIG. 4 shows a flowchart of a method of recording a conversation, according to an exemplary embodiment of the present invention. In this embodiment, the method begins when a user makes or receives a call S440. It is then determined whether or not there is a buffering of the conversation S441. This is determined by a user option stored in the memory if the recording logic is on the communications device. If the recording logic is on the application server on the communications network, then the option is stored in the recorded conversation database. If buffering is enabled, then the communications device or the application server buffers the conversation S442 up to a predetermined time frame until either a recording command is received S443 or the phone conversation ends. If the buffering is not enabled, then the call is treated as a normal call until a recording command is received S443. The recording command may be received by a recording logic on the portable communications device, by a recording logic on an application server on the network, or both for even more security. When the recording command is received S443, the application server or the portable communications device records the conversation S444. The portable communications device records the conversation onto the memory while the application server records the conversation onto a memory or recorded conversation database. At the beginning of the recording process, the buffering ceases, with the recorded buffer remaining in the memory or database. After the recording has begun, it is determined whether there was buffering of the conversation S445. If there was buffering, the recorded buffer is added to the recorded conversation S446. This essentially adds to the beginning of the recorded conversation an amount of time equal to the buffer. For instance, a threat or otherwise offensive comment may have been made which caused the user to start recording. By adding the buffer, this threat may also be contained in the recorded conversation. When the user hangs up S447 the recording is ended S448.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A portable communication device, comprising:
   a processor in communication with an accelerometer of the portable communication device; and
   a recording logic stored on a memory of the portable communication device and in communication with the processor, the recording logic comprising a set of instructions, which when executed by the processor, performs functions including:
      recording a content of a call, received at the portable communication device, on the memory upon the accelerometer detecting a change in a motion of the portable communication device, the change in the motion being at least one of a flipping over of the portable communication device, a turning around of the portable communication device, or a shaking of the portable communication device,
   wherein the portable communication device has a buffer for buffering the content for a predetermined period of time prior to an initiation of the recording, the buffered content being added to a beginning of the recorded content in order to have a complete record of the content of the call.

2. The portable communication device of claim 1, further comprising a transceiver.

3. The portable communication device of claim 2, wherein the transceiver is at least one of a cellular transceiver, a BLUETOOTH based transceiver, or WIFI based transceiver.

4. The portable communication device of claim 2, wherein the recording logic uses the transceiver, upon being executed, to send a message to a network.

5. The portable communication device of claim 1, wherein a fee is imposed for using the recording logic.

6. The portable communication device of claim 5, wherein the fee is based on a length of the recording.

7. The portable communication device of claim 1, wherein the recording of the content of the call is carried out in concert with a call trace feature provided by a network service provider on which the portable communication device operates.

8. The portable communication device of claim 1, wherein the recording of the content of the call continues until the call is ended.

9. The portable communication device of claim 1, wherein the predetermined period of the buffer varies based on a size of the memory and an audio quality.

10. A system, comprising:
    an application server; and
    a recording logic stored on the application server, the recording logic comprising a set of instructions, which when executed by a processor, performs functions including:
       recording a content of a call, received at a portable communication device, on a memory upon an accelerometer of the portable communication device detecting a change in a motion of the portable communication device, the change in the motion being at least one of a flipping over of the portable communication device, a turning around of the portable communication device, or a shaking of the portable communication device,
    wherein the portable communication device has a buffer for buffering the content for a predetermined period of time prior to an initiation of the recording, the buffered content being added to a beginning of the recorded content in order to have a complete record of the content of the call.

11. The system of claim 10, wherein a fee is imposed for using the recording logic.

12. The system of claim 11, wherein the fee is based on a length of the recording.

13. The system of claim 10, further comprising a communication network connecting the portable communication device and the application server.

14. The system of claim 10, wherein the recording of the call is carried out in concert with a call trace feature provided by a network service provider on which the portable communication device operates.

15. The system of claim 10, wherein the recording of the call continues until the call is ended.

16. A non-transitory computer-readable medium having a computer-readable program product stored thereon, the computer-readable program product comprising a recording logic that, when executed by a processor, cause the processor to perform functions including:
    recording a content of a call, received at a portable communication device, on a memory upon an accelerometer of the portable communication device detecting a change in a motion of the portable communication device, the change in the motion being at least one of a flipping over of the portable communication device, a turning around of the portable communication device, or a shaking of the portable communication device;
    wherein the portable communication device has a buffer for buffering the content for a predetermined period of time prior to an initiation of the recording, the buffered content being added to a beginning of the recorded content in order to have a complete record of the content of the call.

17. The computer-readable medium of claim 16, wherein a fee is imposed for using the recording logic.

18. The computer-readable medium of claim 17, wherein the fee is based on a length of the recording.

19. The computer-readable medium of claim 16, wherein the recording of the call continues until the call is ended.

20. The computer-readable medium of claim 16, wherein the recording of the call is carried out in concert with a call trace feature provided by a network service provider on which the portable communication device operates.

* * * * *